May 20, 1958 C. B. FISHER 2,835,734

TELEGRAPH RECEIVERS

Filed Feb. 14, 1956

INVENTOR
CHARLES B FISHER
BY G H Stevenson
ATTORNEY

United States Patent Office 2,835,734

Patented May 20, 1958

2,835,734

TELEGRAPH RECEIVERS

Charles B. Fisher, Montreal, Quebec, Canada

Application February 14, 1956, Serial No. 565,481

10 Claims. (Cl. 178—70)

This invention relates to receiving circuits for direct current telegraph signals and has for its principal object the prevention of the kind of signal distortion known as bias distortion.

Another object is to make the compensation of bias distortion in signals repeated by a receiving relay independent of the strength of the received telegraph signals.

A further object is the simplification of bias compensating circuits for telegraph receivers.

It is well known that telegraph signal pulses transmitted over a line generally arrive at a receiving station distorted somewhat in shape because of the energy storage characteristics of the line itself and any apparatus, relays, condensers, and the like, that may be connected thereto. The distortion appears as a retardation of the growth at the beginning of a pulse and a prolonging of the decay, or tailing, at the end. These effects tend to make the over-all length of a received pulse greater at its base, or zero amplitude level, than the original pulse length and to shorten the effective pulse length at its full amplitude. Conversely, the intervals between successive current pulses, or spaces, tend to be shortened at the base and lengthened at the top.

Because of the distortion, the length of a pulse repeated by a receiving relay will depend, among other things, upon the sensitivity and the bias of the relay. Thus a weakly biased relay may respond to a very low value of pulse current and so make the repeated pulse longer than the original pulse. Conversely, a strongly biased relay may repeat shortened pulses and lengthened spaces. Such changes in the lengths of the pulses and the spacing intervals represents a type of signal distortion which may cause trouble in systems such as telegraph typewriter systems where the pulse length is a critical factor. The distortion is known as bias distortion. When the bias distortion is such as to increase the length of a current pulse it is called marking bias and when it increases the lengths of the spaces it is called spacing bias.

It is known that, in most cases, the length of a distorted telegraph pulse measured at one half its full amplitude is substantially equal to that of the original undistorted pulse and, in practice, telegraph receivers have been provided with biasing arrangements which permit the relay to respond to a received pulse only when the current has risen to about one half its full amplitude for the normal condition of operation.

The present invention provides a simple biasing arrangement for a polarized telegraph relay which produces a substantially steady bias of the proper magnitude during operation and which automatically maintains the bias in its proper relationship to the pulse amplitude when the line current increases above or falls below its normal value. The invention is thus effective in preventing bias distortion in the presence of wide variations in the level of the line current.

In accordance with the invention a biasing winding on a telegraph relay is supplied with a steady biasing current from a condenser which is maintained at a steady voltage by charging current derived directly from the received telegraph pulses through a rectifier or other unidirectionally conducting device. The discharge of the condenser is confined to the path through the biasing winding which is proportioned, as hereinafter described, to produce the required amount of magnetic bias in the relay and also to make the discharge take place at a rate slow enough to maintain a substantially constant current in the bias winding during the spacing intervals.

Since the biasing effect is produced by the received telegraph pulses, its magnitude will follow slow variations of the amplitude of the pulses and will therefore be maintained in a fixed ratio to the received pulse amplitude regardless of variations in the latter. The windings of the relays are proportioned and connected so that the bias winding produces a magnetic force in the relay substantially equal to one half that produced by a telegraph pulse in the operating winding and in opposition thereto. The biasing effect will then have the correct value for the prevention of bias distortion of the repeated signals and this condition will be maintained for a wide range of received pulse amplitudes.

A feature of the invention is a circuit arrangement whereby the absorption of pulse energy from the operating winding by the biasing circuit is prevented. Since the two windings are inductively coupled, the undulating pulse currents in the operating winding would tend to produce circulating currents and a corresponding absorption of signal energy in the bias winding circuit. Such energy loss is prevented, according to the invention, by the use of decoupling means external to the relay magnetic structure whereby the effect of the inductive coupling of the windings is neutralized.

This and other features of the invention will be more fully understood from the detailed description which follows and by reference to the accompanying drawing of which:

Figures 1, 2, 4:
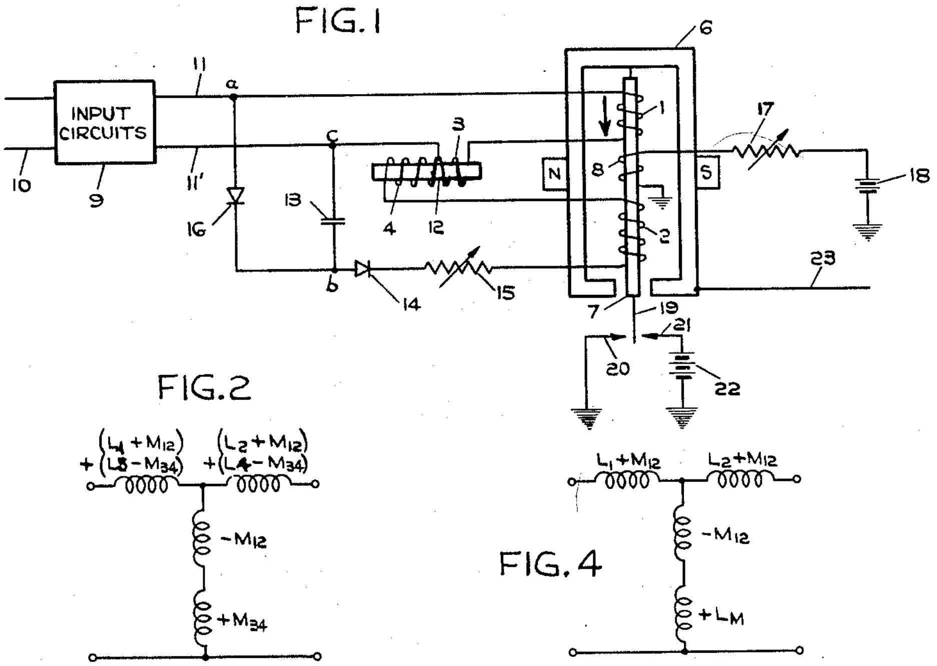
Fig. 1 shows a preferred embodiment of the invention.
Fig. 2 is a schematic illustrating a feature of Fig. 1.
Fig. 4 is a schematic explanatory of Fig. 3.

In Fig. 1 there is shown a polarized telegraph relay of a type in common use. The drawing is not intended to represent the dimensions or the particular mechanical construction of any practical design, but rather to illustrate the general nature of one magnetic structure, suitable, among others, for use in the invention. The relay comprises a rectangular yoke 6, of magnetic material mounted between the poles of a permanent magnet, indicated by N and S, and having an airgap centrally located at one end, as shown. A movable armature 7 is mounted centrally within the yoke, pivoted at one end thereof and extending into the airgap at the other end. The symmetrical arrangement of the magnetic structure is one in which the polarizing flux does not traverse the length of the armature when the latter is positioned centrally in the airgap, the sensitivity of the relay being thereby increased. It will be understood that the magnetic structure is not a part of the invention and that other familiar forms may also be used.

The relay windings comprise an operating winding 1, and a biasing winding 2, which surround the armature and are mounted separately therefrom so that the armature may move freely. A third winding 8 is shown which may be used for certain final adjustments of the circuit.

The circuits external to the relay comprise input circuits, indicated by circuit box 9, connected on one side to a telegraph line 10 and on the other side to leads 11 and 11′ extending to the relay. The input circuits include such conventional elements as may be required for the preliminary treatment of the received telegraph signals. For example, if the signals are transmitted over the line as direct current pulses, the input circuits may consist only of a potentiometer with suitable indicating instruments for adjusting the signals to a suitable normal amplitude. Again, if the signals are transmitted as modulations of a carrier wave, the input circuits will include a suitable carrier filter and a demodulator, together with smoothing means for reproducing direct current signal pulses. In either case the signals delivered by the input circuits will be direct current pulses.

Signal currents pass directly to operating winding 1 of the relay and to winding 3 of a de-coupling transformer 12 in series. Steady current for bias winding 2 is supplied from a condenser 13 of large capacity through a circuit comprising rectifier 14, adjustable resistance 15, winding 2, and winding 4 of de-coupling transformer 12. Charging current for condenser 13 is supplied from lead 11 through a rectifier 16, which may, for example, be a copper oxide or a silicon diode. Rectifier 14 may be of similar type. Relay winding 8 is connected through an adjustable resistance element 17 to a battery 18.

A light metallic arm 19 mounted on an extension of the free end of the relay armature forms the movable contact of the relay. It extends between two fixed contacts, 20 and 21, the first of which is connected to ground and the second to battery 22. Lead 23 is the output connection of the relay through which the repeated pulses are transmitted to a translating device such as a sounder or a tele-typewriter. This lead is shown connected to the metallic structure of the relay through which it is connected to contact arm 19.

The operation of the circuit is as follows: Signal pulses of positive polarity flow in lead 11 to the operating winding 1 of the relay and return through winding 3 of the de-coupling transformer. The current flowing in winding 1 produces a magnetomotive force in the direction indicated by the associated arrow and a resulting magnetic flux which traverses the armature longitudinally and which divides about equally at the air gap between the two halves of yoke 6. This flux will augment the polarizing flux in the right hand part of the air gap and oppose it in the other part of the gap with the result that the armature will be moved to the right and arm 19 will be brought into contact with contact point 21. Current will then flow from battery 22 to otuput line 23.

At the end of a pulse the armature of the relay is moved to the left under the influence of a magnetic bias which is produced as follows: Part of the pulse current in line 11 is diverted to the biasing circuit by way of rectifier 16 to condenser 13 which is charged very quickly to substantially the full voltage of the pulses. The condenser discharges at a substantialy steady rate through the circuit comprising diode 14, resistor 15, bias winding 2 of the relay and secondary winding 4 of decoupling transformer 12. The steady discharge current flowing in bias winding 2 produces a magnetomotive force in the armature which, because of the direction of winding, opposes that produced by the signal pulses in winding 1. The number of turns in winding 2 and the resistance of the biasing circuit are proportioned, as will be described later, so that the steady magnetomotive force produced by the winding is substantially equal in magnitude to one half that produced by the full amplitude pulse current in winding 1. Under that condition, the armature will normally be held to the left with contact arm 19 grounded through contact 20 and, on the appearance of a pulse, will move into contact with contact point 21 only when the pulse current has increased to one half its full amplitude. Likewise, at the end of the pulse, the steady biasing magnetomotive froce will overcome the magnetomotive force of the operating winding and will move the armature to the left as soon as the pulse current falls below one half its full amplitude. In this way, the pulses are repeated in the output circuit with their lengths at the correct values.

Since the relay windings 1 and 2 are coupled inductively, the fluctuating currents in winding 1 will give rise to corresponding fluctuating voltages in the biasing winding and to a substantial amount of energy absorption in the biasing winding circuit due to the circulating currents produced therein. In the circuit of Fig. 1 this energy loss is prevented by de-coupling transformer 12 the windings of which are so proportioned and connected that the voltage induced in the secondary winding by the signal pulses is equal in magnitude to that induced in the biasing winding of the relay and is in opposition thereto in the biasing circuit.

The two sets of windings discussed above constitute two transformers having their primary windings 1 and 3 connected in series between the points *a* and *c* in the drawing and having their secondary windings, 2 and 4, connected in series between points *b* and *c*. By a well known circuit theorem, it may be shown that this portion of the circuit is equivalent to the T-network shown in Fig. 2. In this figure $L_1$ and $L_2$ denote the self inductances of relay windings 1 and 2 respectively and $M_{12}$ denotes the mutual inductance of these windings. Likewise $L_3$, $L_4$, and $M_{34}$ denote respectively the self inductances of windings 3 and 4, of transformer 12 and their mutual inductance. The shunt branch of the T-network contains only the mutual inductances and represents the total effective coupling between the primary and secondary sides. The opposing magnetomotive forces of the relay windings is indicated by the negative sign attached to $M_{12}$ and the opposite inductive effect of the de-coupling transformer windings is indicated by the positive sign of $M_{34}$. Manifestly, the total coupling is reduced to zero when the two mutual inductances are equal in magnitude.

The total impedance of the series branch of the T-network on the primary side is made up of the inductance $L_1$ of relay winding 1 augmented by $M_{12}$ and inductance $L_3$ diminished by $L_{34}$ and has the value $L_1+L_3$ when the two mutual inductances are equal. Making the mutual inductance of the de-coupling transformer equal to and of opposite sign to that of the relay windings thus neutralizes the effect of the coupling between the relay windings and so prevents absorption of signal pulse energy by the biasing circuit.

The biasing circuit, which includes condenser 13, resistance 15, windings 2 and 4 of the relay and the de-coupling transformer is proportioned to provide, first, the correct amount of magnetic bias and, second, substantially steady flow of the biasing current in the relay winding throughout the reception of trains of telegraph signal pulses. The presence of rectifier 16 permits received pulse currents to flow into condenser 13 to maintain the charge therein and also, by virtue of its uni-directional character, confines the condenser discharge to the path through the relay winding. To ensure rapid charging, rectifier 16 should have a low resistance in the forward direction, preferably less than 100 ohms. The voltage of the condenser will then rise very rapidly and attain a steady value substantially equal to the peak voltage of the received pulses.

The magnitude of the steady discharge current will depend principally on the resistance of the discharge path. The magnetomotive force produced by the bias winding will be proportional jointly to the current value and the number of turns in the winding. In most cases it is preferable that the biasing current be small relatively to the current in operating winding, for example, of the order of one tenth or one twentieth of the operating pulse amplitude. These proportions, however, are only typical and are not exclusive.

In an actual embodiment of the circuit of Fig. 1 the circuit elements had the following values: Operating winding 1, of the relay, had 1500 turns and its self inductance, $L_1$, was equal to .384 henry. The total resistance of the primary circuit, windings 1 and 3, was 200 ohms. Biasing winding 2 had 15000 turns and its self inductance, $L_2$, was equal to 38.4 henrys. The two windings were closely coupled and the mutual inductance $M_{12}$ was substantially equal to 1.21 henrys. The ten to one ratio of the turns required that the steady current in the biasing winding should be one twentieth of the operating pulse amplitude to provide the desired degree of magnetic bias. This, in turn, required the resistance of the bias winding circuit, windings 3 and 4 and resistor 15, to be approximately 4000 ohms, of which about 3000 ohms was in the bias winding itself. The mutual inductance of the windings of de-coupling transformer 12 was equal to that of the relay windings, namely 1.21 henrys, and the windings were so poled as to produce the desired opposing voltage in the biasing circuit. The primary and secondary windings had self inductances equal to those of operating winding 1, and biasing winding 2, respectively of the relay. It is to be noted here that since the de-coupling action depends only on the mutual inductance of the windings, the values of the self inductances are not restricted and may be chosen to suit other practical requirements.

The capacity of storage condenser 13 must be sufficiently large to ensure a slow discharge and maintain the biasing current substantially constant during the longest spacing interval likely to occur in a signal sequence. In the physical embodiment of the invention described above, an electrolytic condenser of 250 microfarads capacity, or greater, was found to be adequate for the purpose. Since rectifier 16 confines the condenser discharge to the path through windings 3 and 4, the time-constant of the discharge depends only on the element values in this path together with the condenser capacity. In the example given above the discharge circuit is highly over damped so that the time constant is substantially determined by the path-resistance and the condenser capacity alone. The inductances of the windings have very little effect on the time-constant and such effect as they have on the discharge current is mainly of a smoothing or filtering character.

Rectifier 14 in the discharge path has the purpose of reducing any energy absorption by the biasing circuit that might result from imperfect neuralization of the inductive coupling by transformer 12. It is effective to block circulating currents in one direction and so reduce residual energy absorption by about half. When the de-coupling effect is produced by a transformer, as in Fig. 1, substantially complete de-coupling is readily achieved and rectifier 14 may be omitted.

Winding 8 has the purpose of providing a small corrective bias which may be adjusted when the relay is installed and in operation. It may turn out that certain telegraph circuits require a bias slightly different from the half value provided by the circuit arrangement. Winding 8, having only a small number of turns and supplied with current through an adjustable high resistance, provides such corrective bias without affecting the time constant of the normal biasing circuit.

Figure 3:
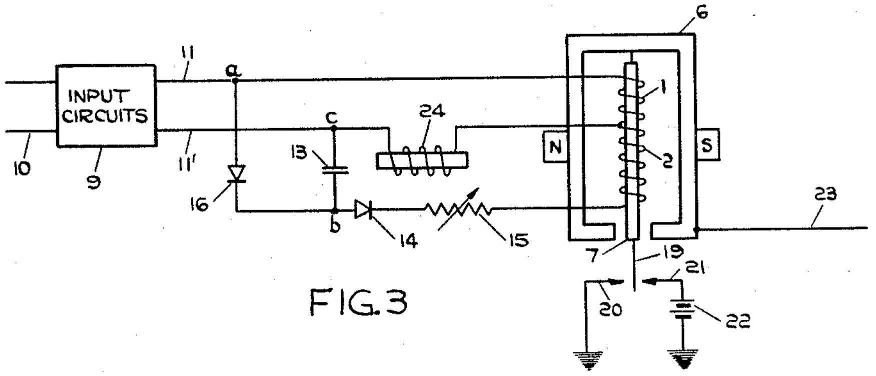
Fig. 3 shows modified form of the invention.

In the modified form of the invention shown in Fig. 3, transformer 12 is replaced by a single coil 24, the inductance of which is equal in value to the mutual inductance of windings 1 and 2 of the relay. The equivalent T-network of the windings and coil 24 is shown in Fig. 4. The self and mutual inductance of windings 1 and 2 are designated by $L_1$, $L_2$, and $M_{12}$ respectively and the inductance of coil 24 by $L_M$. As in Fig. 2 the mutual inductance of the relay windings appears in the shunt branch of the T-network as a negative inductance, and in each series branch as a positive inductance adding to the self inductances. When $L_M$ is made equal to the mutual inductance, the total inductance of the shunt branch becomes zero. That is, the total inductive coupling between the operating and the biasing circuits of the relay is reduced to zero.

For a circuit including the relay described in the physical embodiment of Fig. 1, coil 24 would have an inductance of 1.21 henrys. The total inductance of the operating winding circuit would become $L_1+M_{12}$ and have the value of 1.59 henrys and the total inductance of the biasing circuit would be 39.6 henrys.

When a simple inductance is used for de-coupling, there will remain some residual coupling due to the resistance of the coil which is not present when a transformer is used. This resistance may be made as small as desired by appropriate coil design. However, the effect of the residual resistance coupling is substantially eliminated by rectifier 14 for the reason that the currents produced in the biasing circuit by the flow of the unidirectional signal pulses in the residual resistive coupling are also unidirectional and are opposed by the rectifier. The resistance of coil 24 is therefore unimportant and expensive construction is not needed.

What is claimed is:

1. A receiver for direct current telegraph signals comprising a polar relay, an operating winding and a differential winding thereon, an input circuit for telegraph signals including said operating winding, a branch circuit including said differential winding, rectifying means in said branch circuit poled to transmit received pulses, and filtering means in said branch circuit for producing a substantially steady current from the received signal pulses, the said differential winding having a number of turns such that the steady current therein derived from the received pulses produces a magneto-active force of magnitude substantially equal to one half that produced by the full amplitude of the current pulses in the operating winding.

2. A receiver according to claim 1 including inductive means common to said input and said branch circuit for neutralizing the coupling between said circuits due to mutual inductance of said operating and biasing windings.

3. A receiver in accordance with claim 1 including a transformer coupling said input and said branch circuits, the windings of said transformer having mutual inductance equal to that of the relay windings and of opposite sign thereto.

4. A receiving circuit for direct current telegraph signals comprising a polar relay, an operating and a differential biasing winding thereon, an input circuit for received telegraph pulses connected to said operating winding, a time-constant circuit comprising a resistive branch including said biasing winding and a condenser in parallel with said branch, and uni-directional conductive means coupling said time-constant circuit to said input circuit, said time-constant circuit being so proportioned that in operation the said biasing winding produces a substantially steady magneto-motive force of polarity opposite to that of the said operating winding and of magnitude equal to approximately one half that due to the full amplitude of the telegraph pulse current in the operating winding of the relay.

5. A receiver in accordance with claim 4 including inductive means common to said input circuit and said time-constant circuit for neutralizing the coupling between said circuits due to mutual inductance of the relay windings.

6. A receiver in accordance with claim 4 including an inductor common to said input and said time-constant circuits for neutralizing the coupling between said circuits due to mutual inductance of the relay windings.

7. A receiver according to claim 4 including a transformer coupling said input circuit and said time-constant circuit, the windings of said transformer having mutual inductance equal to that of the relay windings and of opposite signal thereto.

8. A receiver in accordance with claim 4 including an inductor common to said input circuit and said time-constant circuit for neutralizing the coupling between said circuits due to mutual inductance of the relay windings, and a rectifying device in said time-constant circuit poled to prevent the flow of current therein due to the coupling effect of the resistance of said inductor.

9. In a receiver for direct current telegraph signals, a polar relay, an operating winding and a differential biasing winding thereon, means for preventing bias distortion of signals repeated by said relay comprising a circuit connected in parallel with said operating winding, said circuit including in series a rectifier poled to pass received pulses, a resistor, and the said biasing winding, and a condenser connected in shunt to said resistor and said biasing winding, said condenser being proportioned to maintain a substantially steady current in the biasing winding in the reception of a train of telegraph signal pulses, and the turns of said biasing winding being proportioned so that the steady current therein produces a magnetomotive force substantially equal to one half that produced by the full amplitude of a signal pulse current in the operating winding.

10. In a receiving circuit according to claim 9 a transformer having a primary winding connected in series with the operating winding of the relay and a secondary winding connected in series with the said biasing winding, the mutual inductance of the transformer windings being equal to that of the relay windings and of opposite signs thereto.

References Cited in the file of this patent

UNITED STATES PATENTS

| | | |
|---|---|---|
| 1,472,506 | Van Der Vort | Oct. 30, 1923 |
| 1,599,515 | Connery | Sept. 14, 1926 |
| 1,721,952 | Hallden | July 23, 1929 |
| 1,929,879 | Connery | Oct. 10, 1933 |
| 2,721,232 | Kreuzer | Oct. 18, 1955 |